United States Patent
Fontaine et al.

(10) Patent No.: US 10,035,385 B2
(45) Date of Patent: Jul. 31, 2018

(54) TIRE PRODUCING ELECTRICAL POWER

(71) Applicant: The Goodyear Tire & Rubber Company, Akron, OH (US)

(72) Inventors: Sebastien Willy Fontaine, Vichten (LU); Armand René Gabriel Leconte, Bigonville (LU); Frederic Ngo, Blaschette (LU); Claude Ernest Felix Boes, Erpeldange-sur-Sûre (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 429 days.

(21) Appl. No.: 15/049,186

(22) Filed: Feb. 22, 2016

(65) Prior Publication Data

US 2016/0257174 A1    Sep. 8, 2016

Related U.S. Application Data

(60) Provisional application No. 62/127,301, filed on Mar. 3, 2015.

(51) Int. Cl.

| | | |
|---|---|---|
| *B60C 23/04* | (2006.01) | |
| *B60C 23/06* | (2006.01) | |
| *B60C 19/00* | (2006.01) | |
| *B60C 1/00* | (2006.01) | |
| *B60C 11/00* | (2006.01) | |
| *B60C 13/00* | (2006.01) | |
| *B60C 15/00* | (2006.01) | |
| *B60C 23/20* | (2006.01) | |

(52) U.S. Cl.
CPC ............ *B60C 23/0411* (2013.01); *B60C 1/00* (2013.01); *B60C 11/00* (2013.01); *B60C 13/00* (2013.01); *B60C 15/00* (2013.01); *B60C 19/00* (2013.01); *B60C 23/20* (2013.01); *B60C 2001/0091* (2013.01)

(58) Field of Classification Search
CPC .................................................. B60C 23/0411
USPC ......................................................... 290/1 R
See application file for complete search history.

(56) References Cited

U.S. PATENT DOCUMENTS

| | | | | |
|---|---|---|---|---|
| 4,054,478 A | * | 10/1977 | Linnon | ................... H01L 35/08 |
| | | | | 156/242 |
| 4,504,761 A | * | 3/1985 | Triplett | .................... H02N 2/18 |
| | | | | 290/1 R |
| 7,523,656 B1 | * | 4/2009 | Blixhavn | ............ B60C 23/0411 |
| | | | | 73/146.5 |

(Continued)

FOREIGN PATENT DOCUMENTS

WO      WO-0180327 A1 * 10/2001   ......... B60C 23/0411

*Primary Examiner* — Robert C Dye
*Assistant Examiner* — Kendra Ly
(74) *Attorney, Agent, or Firm* — Robert N. Lipcsik

(57) ABSTRACT

The present application relates to a tire (2) comprising a tread portion (4) and sidewalls (6) terminating with beads, with inner sides defining an annular cavity; a deformable structure (8) located in the annular cavity in contact with the inner side of the tread portion (4), said structure (8) comprising bendable elements (10); wherein the bendable elements (10) of the deformable structure (8) comprise a piezoelectric material ($10^2$) so as to produce electrical energy from bending of said elements (10) and comprise at least one thermoelectric material ($10^1$, $10^3$) so as to produce electrical energy from heat of said elements.

16 Claims, 2 Drawing Sheets

(56) References Cited

U.S. PATENT DOCUMENTS

| | | | |
|---|---|---|---|
| 2005/0110277 A1 | 5/2005 | Adamson et al. | |
| 2005/0274176 A1* | 12/2005 | Thiesen | B60C 23/0411 73/146 |
| 2006/0255663 A1* | 11/2006 | Vlad | H02N 2/18 310/26 |
| 2009/0151440 A1* | 6/2009 | Collonge | B60C 23/041 73/146 |

* cited by examiner

TIRE PRODUCING ELECTRICAL POWER

TECHNICAL FIELD

The invention is directed to the field of tires, more particularly tires for vehicles, said vehicles including trucks and passenger cars.

BACKGROUND ART

Prior art patent document published US 2005/0110277 A1 discloses a tire assembly with integrated piezoelectric devices for generating electric power further to the tire deformation while rolling. The piezoelectric devices can be embedded in the tread portion or sidewalls of the tire. They can also be attached to these locations, inside the tire. Alternatively, the tire can be a non-pneumatic one with web spokes extending radially from the inner face of the tread portion to an inner mounting band. The piezoelectric devices can then be attached to the web spokes. The electrical power produced serves then to supply a tire electronic system that comprises a series of sensors, like pressure and temperature sensors, a microcontroller, a battery, an RF transmitter and an antenna for emitting the sensed information to a remote receiver. This teaching is interesting in that the tire produces its own energy for supplying power to its electronic system. The power harvested is however limited to the deformation of the tire. In addition, the power generated by the tire is used only for supplying its own electronic system.

Although there have been significant developments in the developments of tires with regard to energy recovery and fuel consumption, significant room for improvement remains.

SUMMARY OF INVENTION

According to a first aspect, the invention consists of a tire comprising: a tread portion and sidewalls, with inner sides defining an annular cavity; a deformable structure located in the annular cavity in contact with the inner side of the tread portion, said structure comprising bendable elements; wherein the bendable elements of the deformable structure comprise a piezoelectric material so as to produce electrical energy from bending of said elements and comprise thermoelectric material so as to produce electrical energy from heat of said elements.

According to a preferred embodiment of the invention, the bendable elements are rods and the deformable structure is a deformable mesh structure of said rods.

According to a preferred embodiment of the invention, the deformable mesh structure form an annular structure in the cavity.

According to a preferred embodiment of the invention, the deformable mesh structure is produced by 3-D printing. Advantageously, the tread portion, the sidewalls and the deformable mesh structure are produced as a single piece by 3-D printing.

According to a preferred embodiment of the invention, the deformable mesh structure extends radially over at least half of the height of the height of the tire, said height being measured radially from an outer surface of the tread portion until end portions of the sidewalls.

Advantageously, when the tire is mounted on a rim of wheel and in an unloaded state, the deformable mesh structure is designed so as to be distant from the outer surface of the rim. Still advantageously, the deformable mesh structure contacts the rim when the corresponding tread portion contacts the road.

Advantageously, the deformable mesh structure is web-shaped.

According to a preferred embodiment of the invention, the deformable mesh structure comprises at least two adjacent meshes in a radial direction.

According to a preferred embodiment of the invention, the deformable mesh structure comprises at least five adjacent meshes in an axial direction.

According to a preferred embodiment of the invention, the deformable structure is in contact with the sidewalls.

According to a preferred embodiment of the invention, the tire is a non-pneumatic tire, the sidewalls comprising venting holes.

According to a preferred embodiment of the invention, the rods comprise a core made of the thermoelectric material, a first sleeve made of the piezoelectric material around said core and a second sleeve made of the thermoelectric material around the first sleeve.

Advantageously, cores of the rods extend through the sidewalls so as to be in contact with the ambient air of the tire.

According to a preferred embodiment of the invention, the tire further comprises an electrical control unit and electrical leads connecting the piezoelectric material and the thermoelectric materials with said unit.

According to a preferred embodiment of the invention, the tire further comprises at least one of a sensor and a pump, electrically connected to the control unit and wherein said unit comprises at least one electrical energy storage element.

According to a preferred embodiment of the invention, the outer surfaces of the tread portion and of the sidewalls are made of a rubber with carbon black, said surfaces being textured so as to provide extending portions of a diameter of less than 1 mm, preferably less than 0.5 mm.

According to a second aspect, the invention consists of a tire comprising: a tread portion and sidewalls terminating with beads, with inner sides defining an annular cavity; a deformable structure located in the annular cavity in contact with the inner side of the tread portion, said structure comprising bendable elements; wherein the bendable elements of the deformable structure comprise a piezoelectric material so as to produce electrical energy from bending of said elements and comprise thermoelectric material so as to produce electrical energy from temperature difference in said elements; an electrical emitter for wirelessly cooperating with a remote electrical receiver.

According to a preferred embodiment of the invention, the tire further comprises at least one sensor, said sensor and the emitter being electrically fed by the electrical energy produced by the bendable elements, the emitter emitting signals representative of at least one of the list of parameters of the tire comprising temperature and pressure.

According to a preferred embodiment of the invention, the emitter emits the electrical energy produced by the bendable elements, said energy being received by the receiver.

The features of the above preferred embodiments of both first and second aspects are disclosed in any combination provided these combinations are technically compatible.

The features relating to the second aspect are also disclosed in combination with the first aspect and vice versa.

BRIEF DESCRIPTION OF THE DRAWINGS

The novel features believed characteristic of the system of the present application are set forth in the appended claims.

However, the tire itself, as well as a preferred mode of use, and further objectives and advantages thereof, will best be understood by reference to the following detailed description when read in conjunction with the accompanying drawings, wherein.

Figure 1:
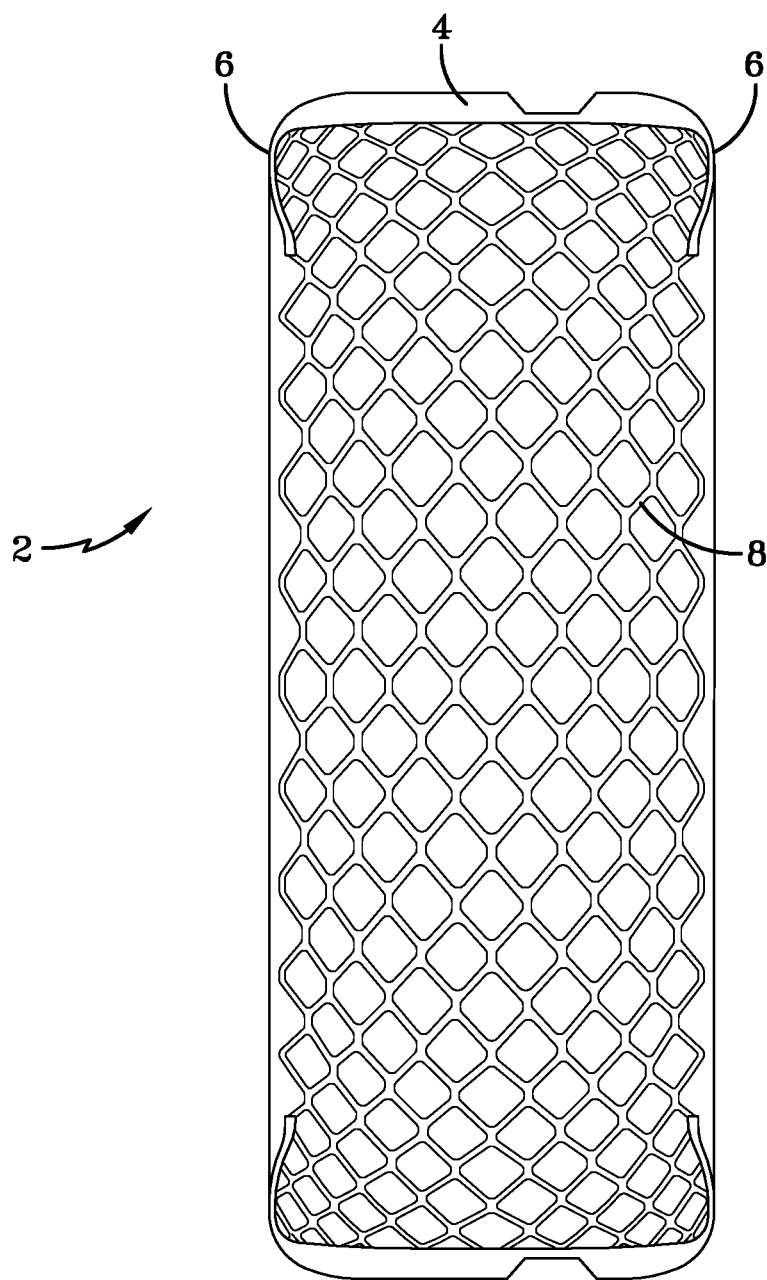
FIG. 1 is a front view in transparency of a tire in accordance with an embodiment of the invention, illustrating a mesh structure.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF EMBODIMENTS OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 2:
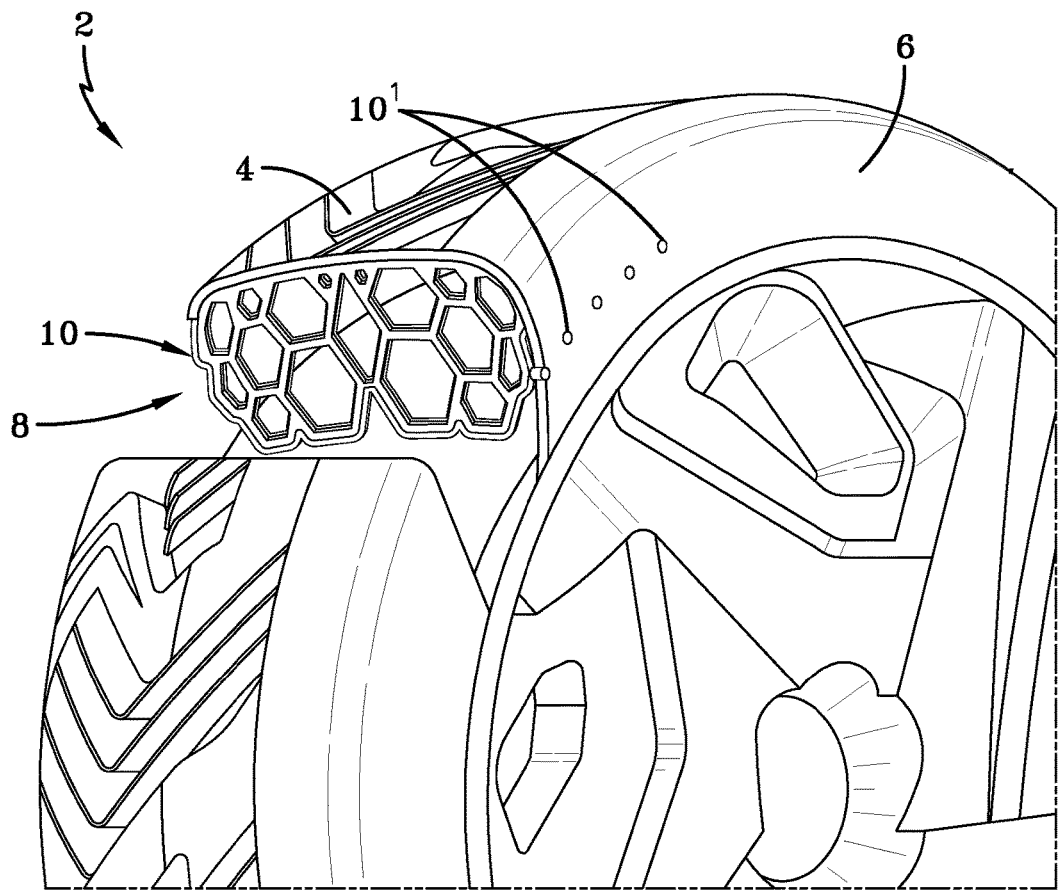
FIG. 2 is a side perspective view of the tire of FIG. 1, the tire being mounted on a wheel rim and exposing its cross-section.

FIGS. 1 and 2 illustrate a tire 2 in accordance with an embodiment of the invention. The tire 2 comprises, as is usual, a tread portion 4 and sidewalls 6 on each lateral side of the tread portion 4. FIG. 1 shows also in transparency a deformable structure 8 that is mesh-shaped. This structure 8 is intended to deform with the tire when rolling on the ground, the cyclic deformation of this structure producing electrical energy. In addition, this structure can also produce electrical energy from the heat originating from the external radiation and the tire warming up while rolling.

FIG. 2 illustrates a cross-section of the tire 2 and more particularly of the mesh-shaped deformable structure 8. As is visible in FIG. 2, the deformable mesh structure 8 is in contact with, and attached to the inner faces of the tread portion 4 and the sidewalls 6. The mesh structure 8 consists essentially of deformable rods 10 that are attached to each other so as to form the illustrated tridimensional mesh structure. FIG. 2 illustrates only a 2D cross-section of the structure being understood that this structure extends annularly along the cavity of the tire as illustrated in FIG. 1.

The tire can be a non-pneumatic one and can comprise venting holes on the sidewalls.

Figure 3:
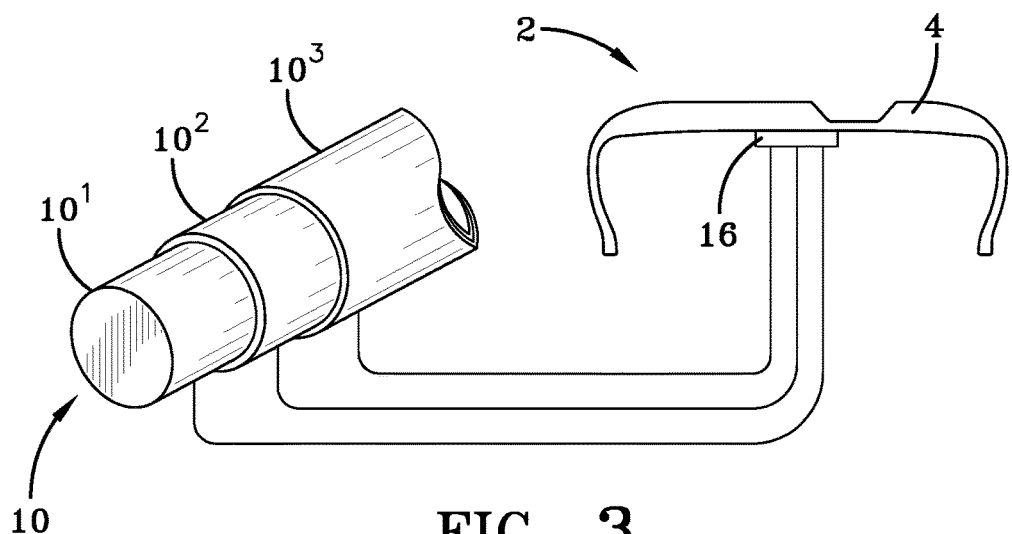
FIG. 3 is a representation of the cross-section of a rod of the mesh structure of the tire of FIG. 1 and its electrical connection to a control unit.

FIG. 3 illustrates the construction of the rods 10 constituting the mesh structure 8. The rod 10 comprises a core $10^1$ made of a thermoelectric material, a first sleeve $10^2$ around the core $10^1$ and made of piezoelectric material, and second sleeve $10^3$ around the first one $10^2$ and made of the thermoelectric material.

Advantageously, the core $10^1$ of the rods extends through the sidewalls so as to be in contact with the ambient air of the tire, as is visible in FIG. 2.

Piezoelectricity is the electric charge that accumulates in certain solid materials (such as crystals, certain ceramics, and biological matter such as bone, DNA and various proteins) in response to applied mechanical stress. Piezoelectric materials can comprise crystals and ceramics. The crystal can be natural such as quartz, or synthetic such as Gallium orthophosphate ($GaPO_4$). Some polymers, like polyvinylidene fluoride (PVDF) can also exhibits piezoelectricity. The mechanical stress in the piezoelectric material of the first sleeve of the rod, resulting from the deformation of said rod, generates an accumulation of electric charges producing a tension.

The thermoelectric effect refers to phenomena by which either a temperature difference creates an electric potential or an electric potential creates a temperature difference. These phenomena are known more specifically as the Seebeck effect (converting temperature to current), Peltier effect (converting current to temperature), and Thomson effect (conductor heating/cooling). In the present case, this is the Seebeck effect that is sought. Indeed, the rubber material of the tire collects heat in two manners. First, the external sun radiation can well be collected by the black outer surface of the tire. Second, the rubber material of the tire, while this latter is rolling, generates heat by internal friction. The external material of the rods is therefore at a higher temperature than the inner material. This temperature gradient is interesting for producing additional electrical power.

While all materials have a nonzero thermoelectric effect, in most materials this effect is too small to be useful. A commonly used thermoelectric material in such applications is the semiconductor bismuth telluride ($Bi_2Te_3$). It can be advantageous to use two different thermoelectric materials, one for the core $10^1$ and another one for the outer second sleeve $10^3$. A thermal gradient formed between these two dissimilar conductors will produce a voltage. Alternatively, two different thermoelectric materials can be provided in the same sleeve $10^3$ or core $10^1$.

FIG. 3 illustrates also in a schematic way a control unit 16 applied against the inner side of the tread portion 4, the control unit being electrically connected to each of the three elements $10^1$, $10^2$ and $10^3$ of the rods 10. This unit 16 can comprise a microcontroller, a battery, an emitter, an antenna and can also be connected to one or several sensors, like a pressure sensor or a temperature sensor. These latter can also be integrated in the unit.

The rods 10 and more generally the mesh structure 8 can be produced by 3D printing. Tridimensional printing is indeed particularly appropriate for producing complex tridimensional structures like a mesh structure.

The mesh structure can be produced so as to provide a series of portions of rods that are electrically insulated from each other, so as to provide a series of generators. These generators can then be connected to each other, i.e. in series or in parallel. For these interconnection, the mesh structure can provide integrated electrical leads extending along the rods.

The electrical power that is collected from the different rods 10 or rod portions of the mesh structure 8 can be used for supplying the control unit 16. It can also charge a battery, i.e. a battery of said unit 16. It can also be transmitted wirelessly to a remote receiver in the vehicle, e.g. for charging a battery of the vehicle. In the case of an electrically powered vehicle, this can be particularly interesting. The drive batteries of such vehicles provide indeed a reduced capacity in cold conditions, e.g. like in winter. In such conditions, the initial temperature inside the tire, including the cores of the rods of the mesh structure, is low. During driving, the rolling of the tire will increase the temperature in the cavity of the tire and thereby also of the outer sleeve $10^3$, thereby producing a temperature gradient between that outer sleeve and the core $10^1$. During driving, the air flow generated by the movement of the vehicle will cool down the cores $10^1$ of the rods that extend through the sidewalls. This temperature gradient generates then a voltage. Essentially independent of the temperature, the cyclic flexion of the rods during rolling generates also a voltage. In sunny conditions, the black outer surface of the tire has for effect to collect a major part of the light radiation and to convert that radiation into a temperature increase of the rubber. Similarly, this will generate a radial temperature gradient in the rods 10 and will thereby also generate a voltage.

For the wireless transmission of electrical power non-radiative techniques (near-field) or radiative (far-field) techniques can be used. In the near-field techniques, power is transferred over short distances by magnetic fields using inductive coupling between coils of wire or in a few devices by electric fields using capacitive coupling between electrodes. In far-field techniques, also called power beaming, power can be transmitted by beams of electromagnetic radiation aimed at the receiver.

The composition of the tread portion and of the sidewalls of the tire can be optimized to collect as much radiation as possible. To that end, the rubber forming the tread portion and/or the sidewalls, at least their outer surfaces, can comprise carbon black. These surfaces can be textured so as to provide hair-like portions extending from said surface with an average diameter of less than 1 mm or even less than 0.5 mm.

The system of the present application provides significant advantages, including: the possibility of recovering electrical power for supplying a control unit in the tire and/or for supplying energy to a remote receiver in the vehicle, e.g. for recharging drive batteries of an electric vehicle.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A tire comprising:
   a tread portion and sidewalls, with inner sides defining an annular cavity;
   a deformable structure located in the annular cavity in contact with the inner side of the tread portion, said structure comprising bendable elements;
   wherein the bendable elements of the deformable structure comprise a piezoelectric material so as to produce electrical energy from bending of said elements and comprise a thermoelectric material so as to produce electrical energy from heat of said elements.

2. The tire according to claim 1, wherein the bendable elements are rods and the deformable structure is a deformable mesh structure of said rods.

3. The tire according to claim 2, wherein the deformable mesh structure forms an annular structure in the cavity.

4. The tire according to claim 2, wherein the deformable mesh structure, the tread portion and the sidewalls are produced by 3-D printing.

5. The tire according to claim 2, wherein the deformable mesh structure extends radially over at least half of the height of the height of the tire, said height being measured radially from an outer surface of the tread portion until end portions of the sidewalls.

6. The tire according to claim 2, wherein the deformable mesh structure comprises at least two adjacent meshes in a radial direction.

7. The tire according to claim 2, wherein the deformable mesh structure comprises at least five adjacent meshes in an axial direction.

8. The tire according to claim 1, wherein the deformable structure is in contact with the sidewalls.

9. The tire according to claim 1, wherein the tire is a non-pneumatic tire, the sidewalls comprising venting holes.

10. The tire according to claim 1, wherein the rods comprise a core made of the thermoelectric material, a first sleeve made of the piezoelectric material around said core and a second sleeve made of the thermoelectric material around the first sleeve.

11. The tire according to claim 1, further comprising an electrical control unit and electrical leads connecting the piezoelectric material and the thermoelectric materials with said unit.

12. The tire according to claim 11, further comprising at least one of a sensor and a pump, electrically connected to the control unit and wherein said unit comprises at least one electrical energy storage element.

13. The tire according to claim 1, wherein the outer surfaces of the tread portion and of the sidewalls are made of a rubber with carbon black, and are textured so as to provide extending portions of a diameter of less than 0.5 mm.

14. A tire comprising:
   a tread portion and sidewalls terminating with beads, with inner sides defining an annular cavity;
   a deformable structure located in the annular cavity in contact with the inner side of the tread portion, said structure comprising bendable elements;

wherein the bendable elements of the deformable structure comprise a piezoelectric material so as to produce electrical energy from bending of said elements and comprise a thermoelectric material so as to produce electrical energy from a temperature difference in said elements;

an electrical emitter for wirelessly cooperating with a remote electrical receiver.

15. Tire according to claim 14, further comprising at least one sensor, said sensor and the emitter being electrically fed by the electrical energy produced by the bendable elements, the emitter emitting signals representative of at least one of the list of parameters of the tire comprising temperature and pressure.

16. Tire according claim 14, wherein the emitter emits the electrical energy produced by the bendable elements, said energy being received by the receiver.

\* \* \* \* \*